Patented Sept. 9, 1952

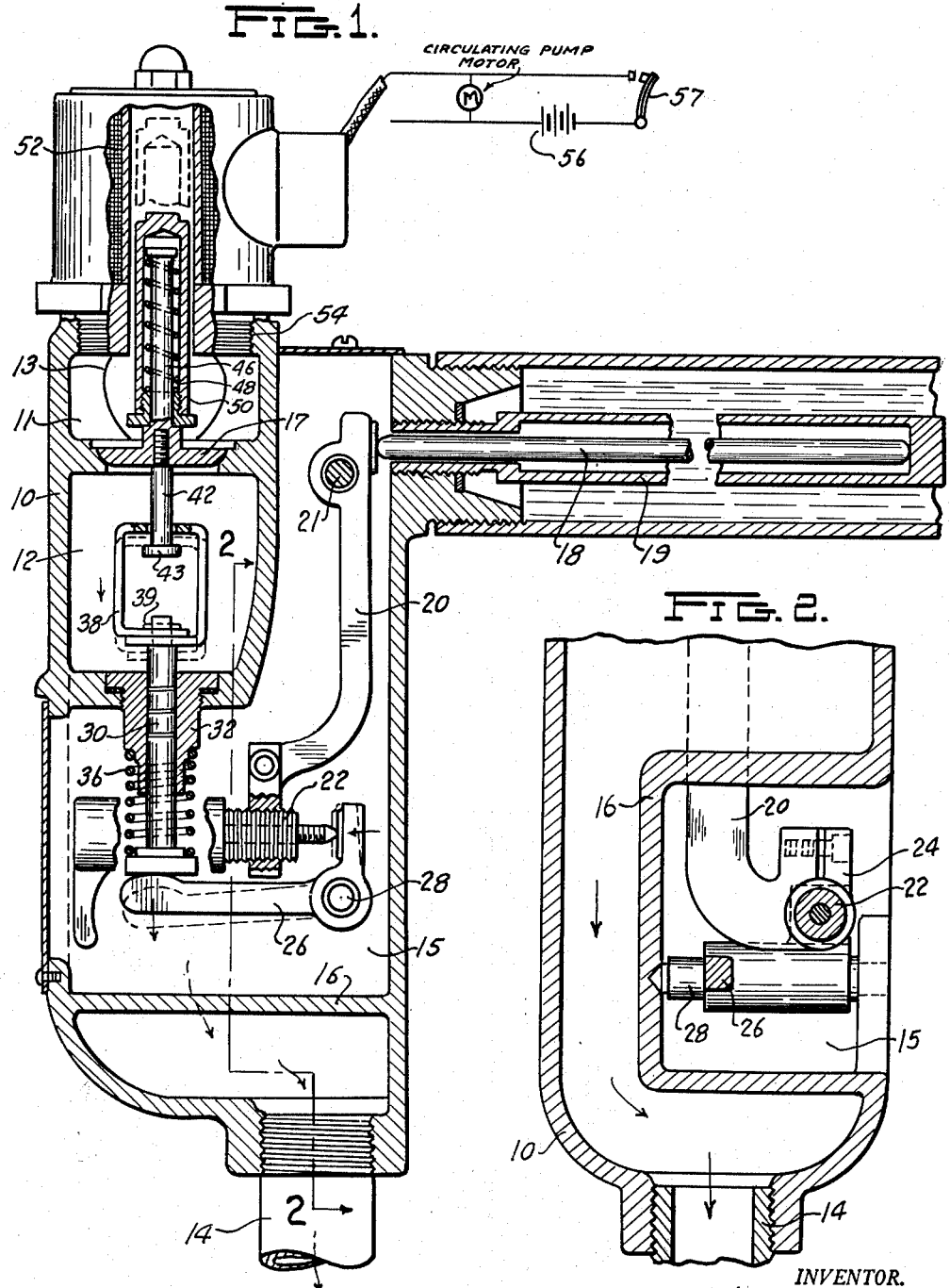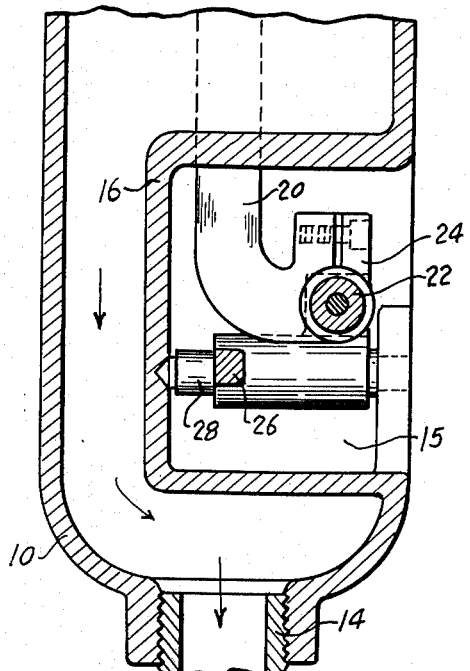

2,609,989

UNITED STATES PATENT OFFICE 2,609,989

GAS VALVE CONTROL

Adolf J. Burklin, Toledo, Ohio, assignor to A. O. Smith Corporation, Milwaukee, Wis., a corporation of New York Application October 7, 1948, Serial No. 53,167

6 Claims. (Cl. 236—9)

This invention relates to a control mechanism for the main gas valve of gas burning appliances such as boilers, water heaters, furnaces and the like.

It has heretofore been proposed to operate gas valves that control the flow of gas to various appliances by means of a solenoid the circuit to which is thermostatically controlled. When the thermostat circuit is closed to the solenoid and power source that gas valve is opened, and when the circuit is interrupted the valve is closed by means of a spring or other biasing force. Such an arrangement is thus limited to the valve standing either in full "on" position or full "off" position and is not susceptible to modulation of the gas flow in accordance with varying heat requirements.

There are, however, many valve control arrangements operated directly by thermo-responsive members in which the degree of valve opening and hence the quantity of gas flow is continuously variable over a wide range. These modulating thermostatically operated valves are, for the most part incapable of remote control.

The primary object of the present invention is to provide an operator for a gas or other fluid control valve capable of furnishing a variable, modulated fluid flow, and operated in response to a plurality of control factors.

Another object of the invention is to provide an operator for a valve for the control of gas or other fluid in which a remotely operated member determines whether the valve is opened or closed and a second member determines the degree of opening movement.

Still another object of the invention is to provide an operator for a valve for the control of gas or other fluid which will operate safely and reliably over long periods without danger of leaks or failure and which is relatively inexpensive to construct.

Other objects and advantages of the invention will become apparent from the following specification, reference being had to the accompanying drawings in which:

Figure 1 is a central vertical sectional view of a valve operating mechanism embodying the present invention; and Fig. 2 is a section on line 2—2 of Fig. 1.

The preferred embodiment of the invention shown in the drawings includes a housing 10 divided internally into an upper gas compartment 11 and a lower gas compartment 12. An inlet pipe indicated at 13 communicates with the upper compartment 11 and an outlet pipe 14 is threaded into the lower wall of the housing to receive gas from the lower chamber or compartment 12. Since the gas compartments must have a minimum of openings through which gas may escape, most of the mechanism of the present operator is housed in a separate chamber 15 separated by a wall 16 from the lower gas compartment. The wall 16 may be cast integrally with the housing 10 and take the form of an inward extension of a side wall thereof.

Communication between the upper and lower gas compartments 11 and 12 is controlled by a valve 17 which may be of any suitable form commonly used in the gas appliance industry.

The valve 17 is operated in response to actuation of a solenoid as hereinafter described and the degree of opening movement is governed by a local thermostat. The local thermostat may comprise any suitable mechanism capable of imparting a continuously variable rectilinear movement to the parts and preferably includes a ceramic rod 18 or any other metallic rod of low coefficient of thermal expansion cooperating with a metallic tube 19 made of copper or other metal having both a high coefficient of thermal expansion and resistance to corrosion since the tube commonly operates immersed in the liquid whose temperature is to be governed. As the temperature of the liquid increases the metallic tube 19 likewise expands but to a greater degree than the associated Invar or ceramic rod 18 thus furnishing a differential movement that can be utilized to operate the remaining elements.

The ceramic rod 18 bears at its inner end against a lever 20 which is pivoted at 21 in the housing 10. The upper end of the lever 20 against which the rod bears is quite short so that the movement of the rod is amplified in the lower end of the lever which is greatly elongated. The lower end of the lever 20 carries an adjusting screw 22 which is threaded in a sidewise extension 24 of the lever and which bears against one arm of a bell crank lever 26 carried on a pivot pin 28. The other end of the bell crank lever 26 bears against the lower end of a push rod 30 which reciprocates in a bearing 32. The push rod 30 is ground or otherwise formed to have a close fit in its bearing and since its movement is entirely rectilinear with no sidewise force exerted thereon the close fit will be maintained over a long period of time. If desired, the bearing 32 may be made as a separate element and threaded to the upper portion of wall 16 which separates the lower gas compartment from the chamber 15 in which the thermostatically operated mechanism is housed.

Push rod 30 is urged downwardly against lever 26 by a spring 36 and the upper end of the push rod connects to a yoke 38 by any suitable connection which will cause the yoke to follow both upward and downward movements of the push rod. Thus the connection may be established by forming a shoulder on the push rod 30 and utilizing a pin 39 above that portion of the yoke which seats against the shoulder of the push rod.

The upper arm of yoke 38 receives a valve stem 42 having a head 43 inside the yoke, which head is larger than the diameter of the valve stem 42 so that the yoke is free to move with respect to the valve stem but once the lost motion between the parts is taken up in any manner the parts will move together by engagement of the yoke and the head 43.

Extending above valve 17 and in alignment with the valve stem 42 is an upper stem extension 46 surrounded by an armature 50 of magnetic material, there being a spring 48 interposed between the armature and the stem extension 46. The armature 50 is guided for rectilinear movements by the stem and exerts a biasing force on the upper stem extension 46 and hence on the valve 17. A solenoid 52 surrounds the armature 50 and the body of the solenoid is threaded as at 54 into the upper end of the housing 10. The solenoid may be gasketed in such a manner that no leakage of gas will take place and since there is no relative motion between the parts a gasketed connection will remain tight indefinitely. Solenoid 52 is connected with a power source 56 and a remote thermostat 57 shown diagrammatically.

If it is assumed that the control mechanism above described is utilized in connection with a hot water heating system in which a room thermostat 57 is connected to the solenoid 52 and the local thermostat comprising ceramic rod 15 and metallic tube 18 is immersed in a water distribution pipe through which heated water is circulated to the heated space, the operation of the invention is as follows:

If the room thermostat calls for heat, that is its circuit is closed so that the circuit to solenoid 52 is closed, armature 50 is drawn upwardly into the solenoid by magnetic attraction and a biasing force through spring 48 is exerted on upper stem extension 46 and hence on valve 17. In most installations a water circulating pump is employed and closure of the solenoid circuit also closes the circuit to the pump and water circulation begins. If the water is sufficiently hot that no additional operation of the gas burner is required, valve 17 will remain closed since the biasing force established by spring 48 is not sufficient to raise yoke 38 against the tension of the heavier lower spring 36. The position of the parts under these circumstances is indicated by the dotted line position of the yoke and of the lever 26.

In general, however, it will be found that when the room thermostat calls for heat the temperature of the water in the circulating system is too low so that the gas burner must ignite and additional heat be supplied to the circulating water. At this time the ceramic rod 18 will be moved to the left in Fig. 1 by the somewhat contracted tube 19 with which it cooperates. The upper end of lever 20 thus moves to the left and the lower end of the same lever moves adjustment screw 22 to the right against bell crank lever 26, the opposite arm being moved upwardly to the position shown in full lines against the tension of the lower heavy spring 36. The yoke 38 is thus moved upwardly and any lost motion which may exist between the yoke and the lower valve stem 42 may thus be taken up by the biasing spring 48 and the valve 17 moved to partially opened position. Gas then flows past valve 17 to outlet pipe 14 and an associated burner.

It will be seen that it is possible for yoke 38 to be moved upwardly when the local thermostat is reduced in temperature without in any way opening the main gas valve 17. The opening movement is expended simply in moving yoke 38 upwardly along the lower valve stem 42 and no gas will be supplied to the appliance until the room thermostat or other operator for solenoid 52 closes the circuit to the solenoid and hence draws armature 50 from its lower position to take up the lost motion between head 43 of the valve stem and the stop provided by yoke 38.

It will also be seen that while the biasing force tending to open valve 17 is established by closure of the solenoid circuit the degree of opening movement that results is dependent entirely on the operation of the local thermostat and hence on the existing water temperature. If the water temperature is sufficiently high, no opening movement of the valve will result since yoke 38 is held in its lower position and if the water temperature is somewhat lower a very slight opening movement in the valve 17 may result. Thus the present valve invention provides for modulated operation of the valve as distinguished from full "on" and full "off" operation which is not desirable in most gas appliances. A much more steady flow of heat will result if the degree of opening movement of valve 17 is made continuously variable over a wide range since the burners can operate steadily at a reduced input thus furnishing a much more even flow of heat to the water and hence to the space to be heated thereby.

It should also be noted that all movements in the push rod 30, yoke 38, lower stem 42, valve 17 and upper valve stem extension 46 are rectilinear movements so that the present invention includes no elements likely to become misaligned and there are no forces tending to move the parts from their rectilinear paths.

The temperature setting and degree of movement imparted to the yoke 38 by the local thermostat may be controlled in any conventional manner as by adjustment of screw 22 and for this purpose the usual removable cover plate is provided for the chamber 15 in which the adjusting screw is housed. Thermostatic adjustment must be made, of course, without in any way opening the chambers containing gas, even on the burner side of valve 17.

By combining the thermostat and solenoid in one unit so that only the single control valve 17 is required there is little resistance to the flow of gas and pressure drop of the gas in flowing through the control unit is held to a minimum.

Various embodiments of the invention may be employed within the scope of the accompanying claims.

I claim:

1. In combination in a heating system, a normally closed fuel valve disposed to control the supply of fuel to the system, means disposed to open said valve, a cushioned lost motion connection between said means and said valve to provide a biasing force for opening the valve when said means is moved to valve opening position and to release said valve when said means is moved to valve closing position, a movable stop disposed to determine the amount said valve opens in any given operation, and a thermostat responsive to the heat medium of said system and operatively connected to move said stop to limit the operation of said valve in a manner modulated to the temperature of such heat medium.

2. In combination with a gas valve for supplying fuel to a heating system, a remote thermostat, means operated by said remote thermostat to apply a biasing opening force to said valve, a local thermostat, a stop to determine the degree of opening of said valve, an operative connection between said local thermostat and stop to move the latter in response to temperature changes effecting said local thermostat, and a lost motion connection between said stop and said valve whereby said stop is free to move without effecting movement of said valve in the absence of said biasing opening force.

3. In combination with a gas valve for supplying fuel to a heating system, a remote thermostat, means operated by said remote thermostat to apply a biasing opening force to said valve, a local thermostat, a stop operated by said local thermostat to determine the degree of opening of said valve, a spring acting on said stop and said valve to maintain the valve closed against said biasing force when said local thermostat is heated to a predetermined value, and a lost motion connection between said stop and said valve whereby said stop is free to move without effecting movement of said valve in the absence of said biasing opening force.

4. In combination in a heating system, a gas valve having a depending stem and an upward stem extension, a magnetic armature associated with said stem extension, a spring interposed between said armature and said stem extension whereby movement of said armature in one direction sets up a biasing opening force in said valve through said stem extension, a remote thermostat, a solenoid operated by said remote thermostat and associated with said armature, a local thermostat, a stop operated by said local thermostat and cooperating with said depending valve stem to determine the degree of opening of said valve, and a lost motion connection between said stop and said depending stem whereby said stop is free to move without effecting movement of said valve in the absence of said biasing opening force.

5. In combination in a heating system, a gas valve having a depending stem and an upward stem extension, a magnetic armature associated with said stem extension, a spring interposed between said armature and said stem extension whereby movement of said armature in one direction sets up a biasing opening force in said valve through said stem extension, a remote thermostat, a solenoid operated by said remote thermostat and associated with said armature, a local thermostat, a yoke operated by said local thermostat and cooperating with said depending valve stem to determine the degree of opening of said valve, a reciprocating stem fixed to said yoke, a spring urging said yoke downwardly with a force greater than said biasing opening force, the force of said spring being overcome by said local thermostat, and a lost motion connection between said yoke and said depending valve stem whereby movement of said yoke by said local thermostat cannot open said valve in the absence of said biasing opening force.

6. In combination in a heating system, a gas valve having a depending stem and an upward stem extension, a magnetic armature associated with said stem extension, a spring interposed between said armature and said stem extension whereby movement of said armature in one direction sets up a biasing opening force in said valve through said stem extension, a remote thermostat, a solenoid operated by said remote thermostat and associated with said armature, a local thermostat, and a stop operated by said local thermostat and cooperating with said depending valve stem to determine the degree of opening of said valve.

ADOLF J. BURKLIN.

REFERENCES CITED

The following references are of record in the file of this patent:

UNITED STATES PATENTS

| Number | Name | Date |
|---|---|---|
| 1,980,789 | Dillman | Nov. 13, 1934 |
| 2,227,447 | Fisher et al. | Jan. 7, 1941 |
| 2,269,016 | Gille | Jan. 6, 1942 |
| 2,457,378 | Johnson et al. | Dec. 28, 1948 |